(12) United States Patent
Sekiya et al.

(10) Patent No.: US 6,718,072 B1
(45) Date of Patent: Apr. 6, 2004

(54) IMAGE CONVERSION METHOD, IMAGE PROCESSING APPARATUS, AND IMAGE DISPLAY APPARATUS

(75) Inventors: Kazuo Sekiya, Tokyo-to (JP); Junya Shimizu, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 673 days.

(21) Appl. No.: 09/723,036

(22) Filed: Nov. 27, 2000

(30) Foreign Application Priority Data

Dec. 22, 1999 (JP) ............................. 11-365016

(51) Int. Cl.$^7$ ................................. G06K 9/32
(52) U.S. Cl. .................. 382/298; 382/293; 382/295; 382/299; 358/1.2; 358/528; 345/671; 345/660; 384/561; 384/581
(58) Field of Search ................... 382/103, 148, 382/190, 164, 165, 277, 281, 282, 287, 291, 293, 295, 298, 299; 358/1.2, 501, 528, 538, 451, 453; 345/660, 671; 348/561, 581, 582

(56) References Cited

U.S. PATENT DOCUMENTS

| | | | |
|---|---|---|---|
| 5,077,805 A | * 12/1991 | Tan | 382/137 |
| 5,373,376 A | * 12/1994 | Dethardt | 358/528 |
| 5,408,329 A | * 4/1995 | Mailloux et al. | 358/3.27 |
| 5,781,244 A | * 7/1998 | Hirose et al. | 348/561 |
| 5,995,660 A | * 11/1999 | Andoh et al. | 382/181 |
| 6,437,881 B1 | * 8/2002 | Baba et al. | 358/434 |

FOREIGN PATENT DOCUMENTS

| | | | |
|---|---|---|---|
| JP | 08-251399 | 9/1996 | H04N/1/393 |
| JP | 11-175710 | 7/1999 | G06T/3/40 |
| JP | 11-296671 | 10/1999 | G06T/3/40 |

* cited by examiner

*Primary Examiner*—Timothy M. Johnson
*Assistant Examiner*—Yosef Kassa
(74) *Attorney, Agent, or Firm*—Lawrence D. Cutter, Esq.; Blanche E. Schiller, Esq.; Heslin Rothenberg Farley & Mesiti P.C.

(57) ABSTRACT

According to the present invention, an image processing apparatus includes an original image data input unit 11 for receiving the original low resolution image data; a connection detector 13 for detecting a connection of a target pixel in the original image data and neighboring pixels; a rule application unit 17 for employing a relationship between a coordinate position of a pixel in the original image data and a coordinate position of a resultant pixel in the expansion image data to define a plurality of types into which the relationship can be sorted, and for applying a specific rule for the plurality of types; and a results output unit 19 for determining the value of the resultant pixel in accordance with the rule, and for outputting the expansion image data, wherein, when the connection detector 13 ascertains that the target pixel constitutes a one-pixel width line, the rule application unit 17 applies a rule that will maintain the one-pixel width even in the expansion image data.

18 Claims, 9 Drawing Sheets

IMAGE CONVERSION METHOD, IMAGE PROCESSING APPARATUS, AND IMAGE DISPLAY APPARATUS

PRIOR FOREIGN APPLICATION

This application claims priority from Japanese patent application number 11-365016, filed Dec. 22, 1999, which is hereby incorporated herein by reference in its entirety.

TECHNICAL FIELD

The present invention relates to a method and an apparatus for increasing, using a rational number multiplier, the resolution of an image consisting of a set of pixels that are represented by digital values.

BACKGROUND ART

Most conventional image expansion techniques employ a natural image, such as a scenery picture, as an expansion target, and substantially there are no stepped edges, such as thin lines, in an image. This is mainly because information is recorded, while the stepped edge is transformed, by the low-pass effects of an image pickup apparatus, into a form represented by, for example, a sigmoid function (a differentiable, continuous function, $f(x)=1/(1+e^{-x})$). Therefore, conventionally, improvements have been performed to determine how to make the outline, which tends to be more ambiguous than necessary, to appear natural, with the assumption that the original image was obtained by sampling a low-pass filtered image.

For resolution conversions, which require the least computations and can be easily implemented, the replica and nearest neighbor methods are used. With the replica method, the simplest, an image is expanded (n+1)/n times by copying the same pixel at every n-th pixel. And with the nearest neighbor method, an image is expanded by copying the pixel of the original image that is closest to the coordinates obtained by converting the resolution. Both the replica method and the nearest neighbor method provide substantially the same results; that is, the mixing of colors among pixels does not occur, and changes in tones are persistent.

Also, a bi-linear interpolation method has been established for the conversion of resolutions. With this method, the coordinates of a pixel point for a resultant image are inversely projected onto the coordinates of the original image. Then, the pixels (four surrounding points, two points on each of two sides, or only one point located at the identical coordinates) of the original image in the vicinity of the coordinates are weighted, using distance, to obtain an average value, which subsequently is regarded as the color of the resultant image.

Furthermore, a bi-cubic interpolation method is also well known. This method applies the same principle as does the bi-linear method, but for two surroundings in the vicinity (16 points). According to this method, it is assumed that the differential continuity and the value change (gradient) of the original image are sufficiently moderate. Colors, which are enhanced by the weighing of parameters, are more clearly defined than they are with the bi-linear method.

In addition, there is a multirate system that is obtained by generalizing the preceding interpolation methods and that requires more computations. The basic configuration of the multirate system provides for low-pass filtering to be performed after up-sampling using zero-value interpolation, and down-sampling is performed to expand an image at a predetermined rate. This configuration can theoretically include the bi-linear method and the bi-cubic method by adequately selecting the low-pass filter. Actually, in many cases a poly-phase configuration or a filter bank configuration is mounted in order to increase the computational efficiency.

However, according to the replica method and the nearest neighbor method, the pixel of an original image is simply held at a new spatial sampling point, and the expanded line width differs depending on the coordinate positions. Since the sensitivity to frequency components of human eyes is high to a low frequency for the angle unit, a serious problem occurs in the readability of a line width in these methods. The study of an eye model is described in reference IEEE Trans. on Image Processing, vol. 4, pp. 1460–1464, 1995. According to this reference, when an oblique line is expanded, it can be assumed that the distortion in a low frequency band, such as an increase in the width of jaggies, can be easily perceived and that the quality will be deteriorated.

Further, according to the bi-linear interpolation method, when the coordinates that are determined for an inversely projected image are located at the same distance on either side of a one-dot width line, the resultant image will invariably represent a line as wide as two lines of a half a color. Therefore, problems occur relative to the uniformity of colors, the legibility of characters and the reproduction fidelity of colors. Although an image in a photo may appear to be satisfactory, the overall impression is of a blur.

Furthermore, the bi-cubic interpolation method has the same problem as does bi-linear interpolation method, where one line is changed into two lines half a color. Thus, the accurate reproductivity of colors of the screen image of a personal computer (hereinafter referred to as a PC) is still problematic. Also, there is a slight occurrence of ringing at sharp boundaries between middle tone colors.

Moreover, when an arbitrary low-pass filter is employed for the multirate system, checkerboard distortion may appear in a resultant image, thereby indicating that the filter designs that can be used are limited. That is, limitations are placed on filter designs in accordance with the images that are to be provided, and required filter conditions, such as the one according to which the filter property for a passing band and a blocking band must be flat, or a condition according to which a down sampling filter is separately provided to introduce an average operation. It is preferable that an FIR (Finite Impulse Response) filter be employed to maintain the linear phase of an image; however, usually, a higher order filter is required to obtain an image quality that is higher than that acquired by the bi-linear or bi-cubic interpolation method.

Conventionally, many improved methods have been proposed to correct outlines produced by bi-linear or bi-cubic interpolation that are blurred or stair-step shaped. However, for these methods it is premised that a boundary has at the least a specified size, and thus a font that has a structure consisting of one pixel width can not be satisfactorily coped with.

In reference Proceedings of the 1999 IEICE General Conference D-11-120, a resolution conversion method employing the re-formation of an oblique outline is proposed whereby the edge of an original image is detected, and an edge having an inclination that corresponds to that of the detected edge is re-formed for the resultant image, so that jaggies that are generated due to the expansion of an oblique line can be replaced on the resultant image with fine steps.

According to this method, however, a 3×3 sized filter, at the least, must be employed to detect the edge, and the fine structure of a font can not be expanded.

In reference IEEE Proceedings of International Conference on Image Processing 1997, vol. I, pp. 267–270, October 1997, a method is described whereby linear expansion is employed for an edge that is enhanced in an original image. However, this method is not effective when a structure is smaller than the size of an edge detection filter, and outstanding stair-stepping jaggies are produced unless shaping is performed for an inclined boundary.

Further, in reference IEEE Transactions on Image Processing, vol. 8, no. 5, pp. 629–639, May 1999, a method is proposed for changing a distance weighing that is used for the interpolation of an outline. According to this method, a steep change on the original image is detected by four pixel points that are on both sides of a target pixel, and the distance from the interpolation point that is used for bi-linear or bi-cubic interpolation is changed. While this method is effective for obtaining a clear outline for a natural image, however, such as for a PC screen image, substantially it is only as effective as the nearest neighbor method.

SUMMARY OF THE INVENTION

To resolve the above technical problems, it is one object of the present invention to use an outstanding color to represent a font or a thin line on a graphics screen that is handled by an information display device, such as an LCD (Liquid Crystal Display) panel or a projector, and that includes many stepped edges, such as thin lines.

It is another object of the present invention to provide a new image resolution conversion method for enabling real time processing even for a large number of pixels.

To achieve the above objects, according to the present invention, an image conversion method for converting original input image data into image data that is expanded less than twice, comprises the steps of: examining a connection between a target pixel in the original input image data and pixels neighboring the target pixel; employing the connection to determine whether the target pixel constitutes a one-pixel width line; determining, when the target pixel constitutes a one-pixel width line, the value of a resultant pixel in the expansion image data in order to retain the one-pixel width even in the expansion image data.

For the determination made to decide whether a target pixel constitutes a one-pixel width line, if the pattern of the connection with the target pixel is a vertical, horizontal or oblique one-pixel width line, it can be ascertained that the pertinent pixel constitutes a one-pixel width line. The value of the resultant pixel is obtained as the digital output for an R (red), G (green) or B (blue) color signal. It should be noted that the color signals are not always limited to R, G and B, and that the value of the resultant pixel may also be output as the value of a color signal for X, Y or Z, $L^*a^*b^*$, Y, M, C or K.

The value of a pixel is determined, so that the connection with the neighboring pixels is retained when the value of the resultant pixel in the expansion image data is determined. For example, for a pattern wherein lines obliquely intersect, the connection of lines that intersect each other can be maintained.

The original image data are color image data. And when between the target pixel and the neighboring pixels colors match or are similar, it is ascertained that the connection with the neighboring pixels is established. The value of the resultant pixel in the expansion image data is determined so that the color of the resultant pixel matches the color of the target pixel. This arrangement is preferable because a fine structure can be prevented from being battered due to a feathering phenomenon, and because clear, expanded character images, such as fonts, can be obtained. To facilitate the determination as to whether colors are similar or not, a differential value, for example, for a color that can be regarded as being substantially the same as the color of the target pixel is stored in memory in advance. Then, when a color value falls within the range represented by the differential value in the memory, it is ascertained that the color is similar. Further, the present invention can also be provided so that when the color of neighboring pixels matches the color of the target pixel, between the original input image data and the expansion image data the number of colors is substantially unchanged.

According to the present invention, an image conversion method for converting original input image data into expansion image data that is expanded a rational number, which is not an integer, of times, comprises the steps of: detecting a connection between a target pixel in the original input image data and pixels neighboring the target pixel; employing a relationship between a coordinate position for a pixel in the original image data and a coordinate position for a resultant pixel in the expansion image data to define fixed mapping that is prepared for a plurality of types into which the relationship is sorted; and determining a value for the resultant pixel based on the mapping, while the connection with the neighboring pixels is also maintained for the expansion image data.

The increase in the size of the expansion image data provided by conversion is less than twice, and the mapping is defined by a combination of a coordinate point type that does not perform expansion and a coordinate point type that basically performs expansion. There are four coordinate point types: a type for dominating one peripheral pixel of the resultant pixel, a type for vertically dominating two pixels, a type for horizontally dominating two pixels, and a type for dominating four neighboring pixels. The sorting into these coordinate point types can be used for a rule-based expansion in the invention. Further, in the above example, the coordinate point type that does not perform expansion may be the type that dominates one neighboring pixel of the resultant pixel, while the coordinate point type that basically performs expansion may be the type that vertically dominates two pixels, that horizontally dominates two pixels, or that dominates four pixels of the resultant pixel.

When the connection with the neighboring pixels is employed to determine that the target pixel constitutes a one-pixel width line, a one-pixel width is maintained for the coordinate point type that basically performs expansion, and the value of the target pixel is allocated for a specific resultant pixel, while the value of a peripheral pixel of the target pixel is allocated for a resultant pixel other than the specific resultant pixel.

Further, according to the present invention, an image processing apparatus for producing, by conversion, expansion image data that is less than twice the size of the original input image data that is converted, comprises: determination means, for employing a connection of a target pixel in the original image data with peripheral pixels of the target pixel to determine whether the target pixel constitutes a one-pixel width line; rule application means, for employing a relationship between a coordinate position of a pixel in the original image data and a coordinate position of a resultant pixel in the expansion image data to define a plurality of types into which the relationship is sorted, and for applying a rule to the plurality of types that are defined; and output means, for, when the determination means determines that the target pixel constitutes a one-pixel width line, outputting a value for a resultant pixel that in accordance with a specific rule for maintaining a one-pixel width line applied by the rule application means constitutes the expansion image data. The determination means, the rule application means and the output means can be provided by mounting an algorithm as software, or can be implemented by hardware incorporating a circuit.

The determination means employs the connection with the peripheral pixel to determine whether the target area at the least forms a two-pixel width area. And when it is ascertained by the determination means that the target area at the least forms a two-pixel width area, the output means outputs the value of the resultant pixel to increase the width of the area.

When, like a striped pattern, a line that is to be expanded can not be determined locally, from the lines in the pattern one line can be selected that connects to a portion having a predetermined size in an area that may be expanded vertically and horizontally.

According to the present invention, an image processing apparatus for converting original input color image data having a low resolution into expansion color image data having a high resolution, comprises: width examination means, for comparing a target pixel in the original color image data with image data that are produced by peripheral pixels to determine whether the target pixel is a pixel having a small width or a large width; and determination means, for determining a value for a resultant pixel that constitutes the expansion color image data, so that a small width is maintained when the width examination means ascertains that the target pixel has the small width, or so that a large width is further expanded when the width examination means ascertains that the target pixel has the large width. This arrangement is preferable because a thin line having a clear, sharp image can be maintained, and an expanded font image is much easier to see.

In addition, the expansion color image data is obtained by increasing less than twice the resolution of the original color image data. The width examination means then determines whether a pixel having a small width is a pixel that constitutes a one-pixel width line, and the determination means determines the value of the resultant pixel, so that the one-pixel width is maintained for a corresponding line of the expansion color image data.

The image processing apparatus further comprises: the color examination means, for examining the color of the target pixel in the original color image data, and the determination means, for determining the value of the resultant pixel by using unchanged, without mixing with the color that is identified by the color examination means, the color of the target pixel. This arrangement is superior because a sharp, expanded image can be obtained wherein the feathering of color is reduced.

According to the present invention, an image processing apparatus, which produces, by conversion, high resolution expansion image data that is less than twice the size of the original input image data that is converted, and which outputs the expansion image data, comprises: a detector for detecting a connection of a target pixel in the original image data in accordance with a value of the target pixel and a value of neighboring pixels; a width expansion determiner for employing the connection that is detected by the detector to determine whether the width of the target pixel can be expanded; and a rule application unit for employing a relationship between a coordinate position of a pixel in the original image data and a coordinate position of a resultant pixel in the expansion image data to define a plurality of types into which the relationship is sorted, and for employing the output from the width expansion determiner to apply a specific rule for the plurality of types that are defined.

Furthermore, the width expansion determiner employs the connection obtained by the detector to determine whether the target pixel is a portion, having at the least a specific size, in an area that can be expanded vertically and horizontally. When the target area is the portion, it is ascertained that the width of the target pixel can be expanded. This arrangement is preferable because even for an image, such as a stripe pattern, for which whether expansion is possible can not be determined merely from the pixel width, the width can be expanded while taking into the account the continuity of the target pixel and the above described portion.

Moreover, according to the present invention, an image processing apparatus, which produces, by conversion, expansion image data that is less than twice the size of the original image data that is converted, comprises: input means, for receiving the original image data; connection examination means, for examining the connection of a target pixel in the original image data input by the input means and neighboring pixels; judging means, for employing the connection obtained by the connection examination means to determine whether the target pixel constitutes a one-pixel width line; and determination means, for, when the judging means determines that the target pixel constitutes a one-pixel width line, determining a value for a resultant pixel in the expansion image data, so that the one-pixel width in the expansion image data is maintained.

The value of a pixel is determined, so that the connection with the neighboring pixels is retained when the value of the resultant pixel in the expansion image data is determined.

Further, the original image data input by the input means are color image data. And when between the target pixel and the neighboring pixels colors match or are similar, the connection examination means ascertains that the connection with the neighboring pixels is established. The determination means determines the value of the resultant pixel in the expansion image data so that the color of the resultant pixel matches the color of the target pixel.

The above described processing can be performed for the determination of whether the target pixel constitutes a one-pixel width line, the examination of the connection and the determination of whether the colors are similar using previously mentioned ways, so no further explanation for these processes will be given.

According to the present invention, an image display apparatus, which produces, by conversion, high resolution expansion image data that is less than twice the size of the original low resolution image data that is converted, comprises: an original image data input unit for receiving the original low resolution image data; a connection detector for detecting a connection of a target pixel in the original image data input by the original image data input unit and neighboring pixels; a rule application unit for employing a relationship between a coordinate position of a pixel in the original image data and a coordinate position of a resultant pixel in the expansion image data to define a plurality of types into which the relationship can be sorted, and for applying a specific rule for the plurality of types that are defined; a results output unit for determining the value of the resultant pixel in accordance with the rule applied by the rule application unit, and for outputting the expansion image data; and an image display unit for displaying an expanded high resolution image based on the output of the results output unit, wherein, when the connection detector ascertains that the target pixel constitutes a one-pixel width line, the rule application unit applies a rule that will maintain the one-pixel width even in the expansion image data.

The image display unit corresponds, for example, to a display panel, such as an LCD panel, or a projector. When the connection detector ascertains that the target pixel is connected to the neighboring pixels, the rule application unit applies the rule to maintain the connection with the expansion image data. This arrangement is superior in that the rule can be formulated even when the foreground and the background are not identified.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE SYMBOLS

Figure 1:
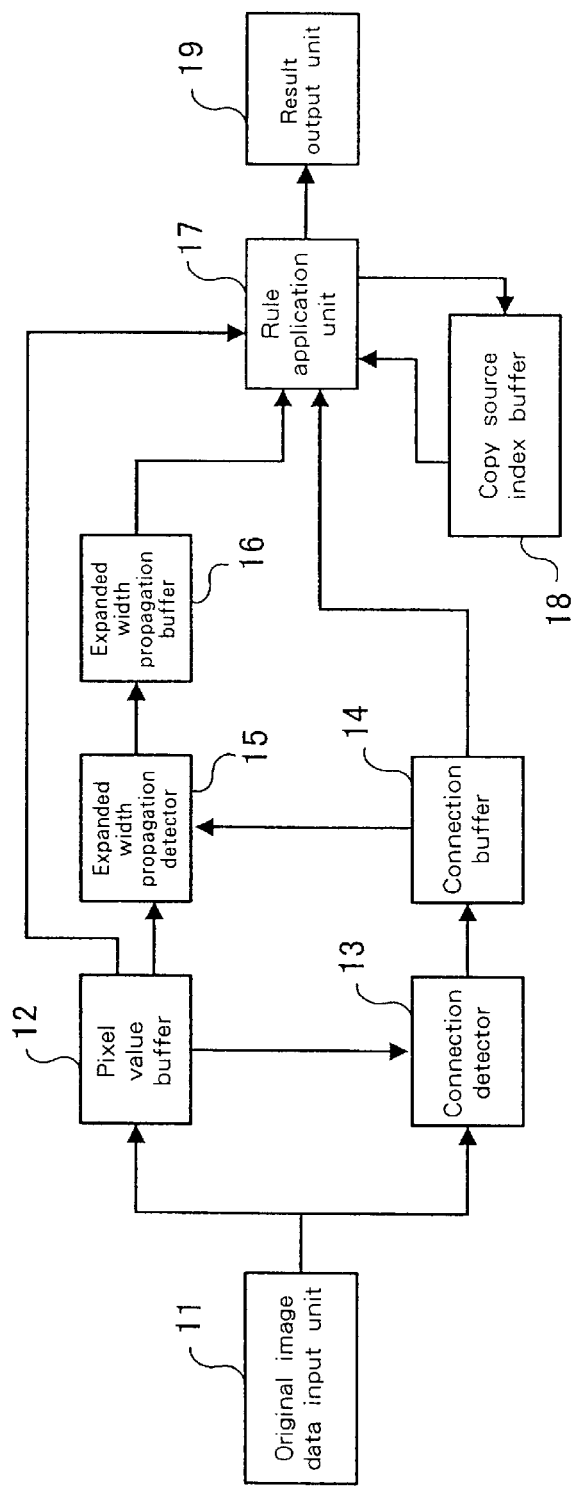
FIG. 1 is a diagram illustrating the arrangement of an image processing apparatus according to one embodiment of the present invention.

11: Original image data input unit
12: Pixel value buffer
13: Connection detector
14: Connection buffer
15: Expanded width propagation detector
16: Expanded width propagation buffer
17: Rule application unit
18: Copy source index buffer
19: Result output unit
50: Target pixel

BEST MODE FOR CARRYING OUT THE INVENTION

Before beginning the explanation of an image processing apparatus according to the preferred embodiment, an algorithm for a conversion method used for the embodiment will be described in detail so that the invention can more easily be understood.

Generally, the image interpolation methods can be roughly sorted into two types: a first method that requires a small number of computations and that can easily be implemented, and a second method that precisely estimates unknown pixels, even though many computations are required. The first method is mounted as a resolution converter in a high-resolution LCD panel, and tends to be used for a real time processing. The second method is used when an abundant computation resource, such as a DSP (Digital Signal Processor), is available, or when a real time processing is not always required.

In this embodiment, a first target consists of an algorithm and a digital hardware circuit for image expansion, both of which are installed in a computer monitor for a flat-panel display that has a fixed screen resolution, such as an LCD or a PDP (Plasma Display Panel), or a projector. For a multi-sync CRT that has a resolution that is not fixed, an analog resolution conversion can be performed, while for a flat-panel display, such as an LCD, a digital processing is required for which special, high-speed hardware is used that can output the resultant resolution at the speed attained by a video clock.

A system that is a first target for the embodiment is a digital hardware circuit for expanding an input image. The system receives the video output of an SVGA (Super Video Graphics Array) (800×600 dots), an XGA (Extended Graphics Array) (1024×768 dots) or an SXGA (Super Extended Graphics Array) (1280×1024 dots) video adaptor, and uses a PC to display the resultant image on the screen of a monitor such as an SXGA, a UXGA (Ultra Extended Graphics Array) (1600×1200 dots), or a QXGA (Quad Extended Graphics Array) (2048×1536 dots). The image data received by the circuit are color data for pixels for a monitor display, and the values are digitized. The system is used for an LCD, which displays the output of a notebook PC (generally an SVGA or an XGA), or for a projector (generally an SXGA), or is requested by an LCD monitor having a higher resolution than a CRT (generally up to UXGA) such as a QXGA or QUXGA (Quad Ultra Extended Graphics Array) (3200×2400 dots). This is because video cards and applications generally handle only CRT resolutions.

The application of the expansion and reduction of images by PCs has recently been increased. The method of the embodiment provides a resultant quality superior to a well known algorithm, and can be mounted as a software tool for an image processing application. This is defined as a second target system. Since for this system the real time processing need not be processed at the speed of a video clock, several modified forms can be proposed while taking into account the balance with the number of computations.

In this embodiment, conversion using a rate represented by a rational number equal to or greater than 1 and less than 2, such as for a conversion from SXGA to QXGA, is mainly performed. In order to retain the aspect ratio that is the ratio of the vertical length of an image to the horizontal length, there are six image expansion non-integers less than twice that can be used as specific resolutions for a PC:

3/2 (SXGA to QXGA)
5/4 (VGA to SVGA, XGA to SXGA, QXGA to QSXGA)
8/5 (VGA to XGA, SVGA to SXGA, UXGA to QSXGA)
25/16 (XGA to UXGA, QXGA to QUXGA)
32/25 (SVGA to XGA, UXGA to QXGA)
75/64 (SXGA to UXGA, QSXGA to QUXGA).

Although an expansion produced by multiplying by twice or greater is not considered here, it can be easily introduced by applying this method.

In the above cases, a video clock of 50 to 65 MHz is required for XGA; 80 to 115 MHz, for SXGA; 120 MHz or higher, for UXGA (60 MHz or higher when the panel is divided by two); or 200 MHz or higher, for QXGA (50 MHz or higher when divided by four). Regardless of the screen size on the input side, values for pixels must be generated at the above speed.

In this embodiment, a rule-based image expansion method is proposed whereby real time processing is performed even with the above high resolutions, and whereby high-speed processing can be performed by the logical development of a circuit.

Figure 6:
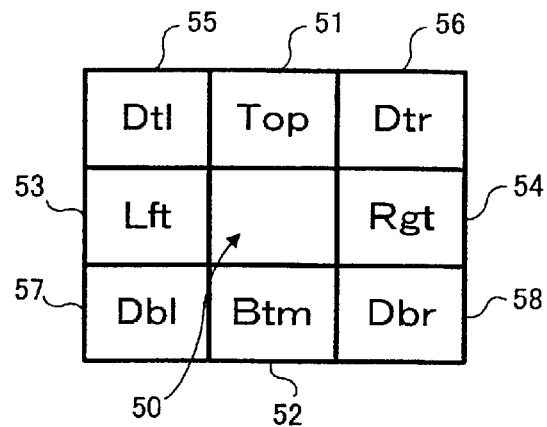
FIG. 6 is a diagram for explaining neighboring pixel connections in accordance with this embodiment.

FIG. 6 is a diagram for explaining the connection of neighboring pixels according to the embodiment.

Each pixel value V [X, Y] of the original image is represented by eight bits (0 to FFh) for each R (red), G (green) B (blue). For each pixel of an original image, an 8-bit memory is prepared to indicate the connection of neighboring pixels in eight directions (vertically, horizontally and obliquely). As is shown in FIG. 6, the neighboring directions for a target pixel 50 are called Top (immediately above) 51, Btm (immediately below) 52, Lft (left) 53, Rgt (right) 54, Dtl (upper left) 55, Dtr (upper right) 56, Dbl (lower left) 57 and Dbr (lower right) 58, and in this embodiment, these directions are called "neighbor connections." The RGB value of each pixel (the target pixel 50) of the original image is compared with that of each neighboring pixel. When the two are the same color, a corresponding bit, one of eight bits, is set to 1, while when the two are different colors, a corresponding bit is set to 0. When, for example, only the Top 51 and the Btm 52 are 1 and the other pixels are 0, it is assumed that an image is a vertical line having a width of one dot and a length of three or more dots. Whether the two pixels represent the same color can be ascertained by determining whether a difference in the RGB values is a predetermined value, and the difference need not completely match the predetermined value.

Figure 7:
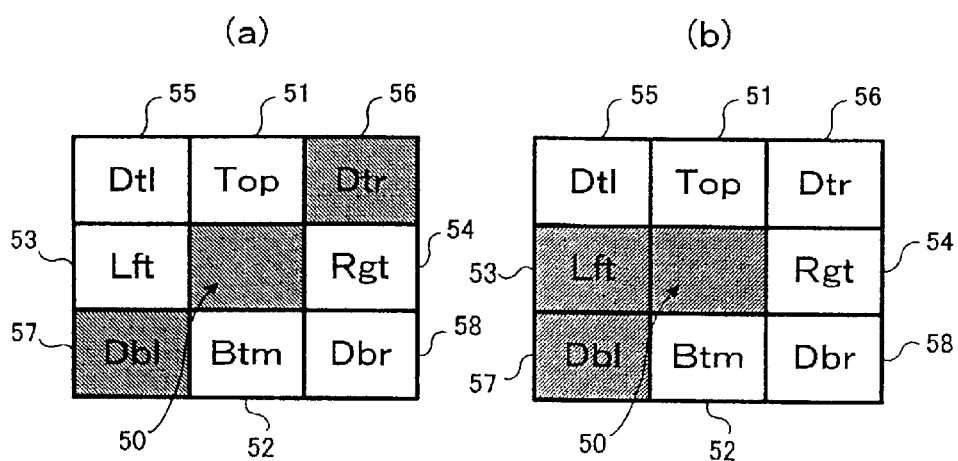
FIGS. 7A and 7B are diagrams showing example neighboring pixel connections.

FIGS. 7A and 7B are diagrams showing the connection of neighboring pixels. In the examples in FIGS. 7A and 7B, boundaries run from upper right to lower left, and the connection is represented by shaded blocks. In FIG. 7A, the oblique boundaries are on the line toward both Top 51 and Lft 53 and on the direction toward both Rgt 54 and Btm 52. And in FIG. 7B, the oblique boundary is on the line toward both Rgt 54 and Btm 52. A difference between the embodiment and a conventional detection pattern is that a connection is detected for each pixel. For example, in FIG. 7B the target pixel (center point) 50 is connected to Lft 53, but is not connected to Dtl 55 and Top 51. However, when the connection is examined for Lft 53, i.e., when Lft 53 is defined as the center point (target pixel 50), connection to Dtl 55 or Top 51 may be established.

The connections are sorted by tracking the 8-bit connection that is determined for each pixel. That is, if the characteristic can be sorted by performing only one peripheral cycle, tracing is not required. However, if two or more peripheral cycles are required to sort the characteristic, the pixels are recurrently examined; for example, the connection of neighboring pixels that has been established is referred to, and then a neighboring pixel for which a connection has also been established is referred to.

The greatest advantage in determining the connection for each pixel individually is that, for example, even in a pattern where the color gradually changes, one line can be identified as being a single, separate line. And since the detection of the connections is not for the extraction of text, regardless of the foreground and the background, and regardless of the meaning of a connection, all the pixels are sorted for detecting connections.

Next, a sorting method employed in accordance with the position of a pixel in the original image will now be described. Since the sorting of the position is easily understood on the analogy of the replica method that was explained in the background description, the replica method is employed first for the explanation.

When the image is expanded 3/2 times using the replica method, a value v (x, y) for the resultant pixel is determined as follows by using a value V [X, Y] for the original pixel.

Type A: Even numbers for both X and Y of the original coordinates
[Equation 1]

$$v\left(\frac{3}{2}X, \frac{3}{2}Y\right) \leftarrow V[X, Y]$$

Type B: An odd number for X and an even number for Y of the original coordinates
[Equation 2]

$$v\left(\left[\frac{3}{2}X\right]-1, \frac{3}{2}Y\right), v\left(\left[\frac{3}{2}X\right], \frac{3}{2}Y\right) \leftarrow V[X, Y]$$

Type C: An even number for X and an odd number for Y of the original coordinates
[Equation 3]

$$v\left(\frac{3}{2}X, \left[\frac{3}{2}Y\right]-1\right), v\left(\frac{3}{2}X, \left[\frac{3}{2}Y\right]\right) \leftarrow V[X, Y]$$

Type D: Odd numbers for both X and Y of the original coordinates
[Equation 4]

$$v\left(\left[\frac{3}{2}X\right]-1, \left[\frac{3}{2}Y\right]-1\right), v\left(\left[\frac{3}{2}X\right]-1, \left[\frac{3}{2}Y\right]\right),$$
$$v\left(\frac{3}{2}Y, \left[\frac{3}{2}Y\right]-1\right), v\left(\left[\frac{3}{2}X\right], \left[\frac{3}{2}Y\right]\right) \leftarrow V[X, Y]$$

The symbols that enclose (3/2)X and (3/2)Y in these equations represent the raising to a unit.

Figure 8:
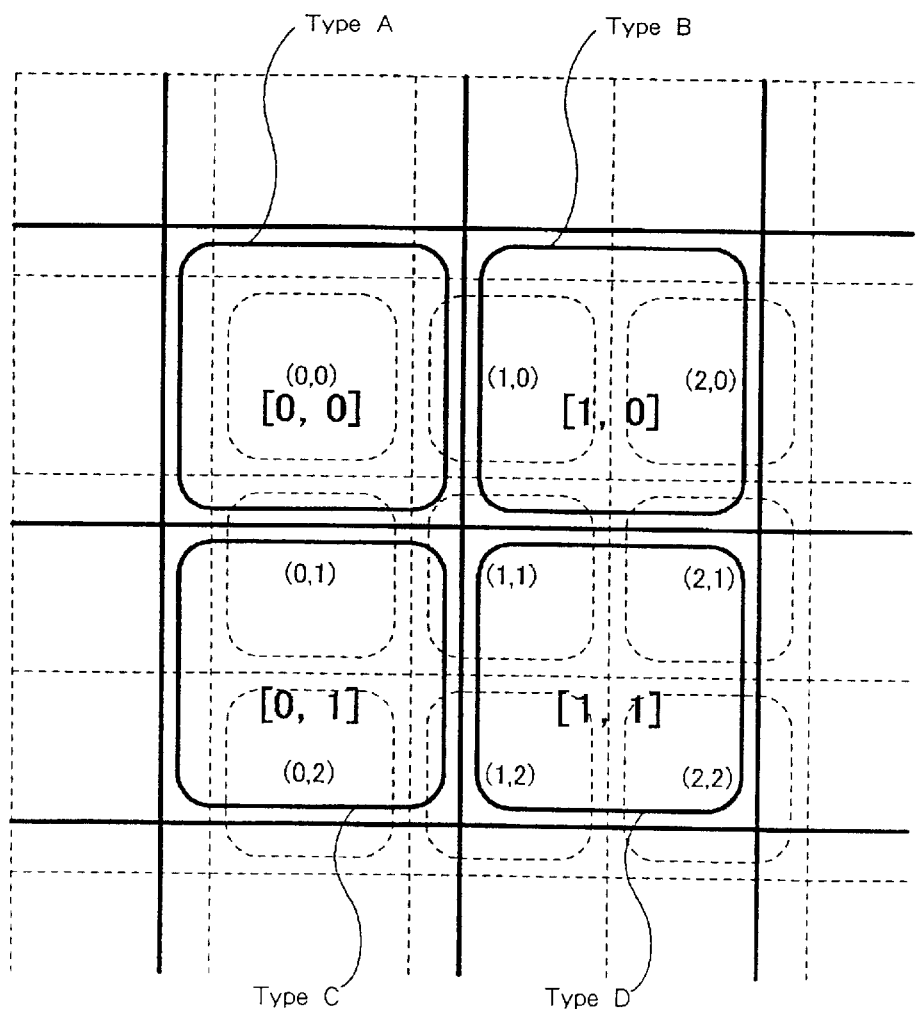
FIG. 8 is a diagram for explaining the relationship of pixel coordinates.

FIG. 8 is a diagram for explaining the coordinates of the pixels. The thick, solid lines represent pixels at the same resolution as the original image, and the thin, broken lines represent pixels at the resolution of the expanded image. [0, 0] represents a pixel having even numbers for X and Y of the original image, and [1, 1] represents a pixel having odd numbers for X and Y of the original image. The coordinates of the resultant image are superimposed so that the center of pixel (0, 0) matches the center of pixel [0, 0] of the original image. [0, 0] of the original image corresponds to type A, [1, 0] corresponds to type B, [0, 1] corresponds to type C and [1, 1] corresponds to type D. These types respectively dominate one pixel, two pixels, two pixels and four pixels of the resultant image.

In this embodiment, sorting of types A to D is employed. That is, when [0, 0] are the coordinates of the original image when it is read from a frame buffer, the pixel (0, 0) of the resultant image is determined. Similarly, pixels (1, 0) and (2, 0) are determined for coordinates [1, 0], pixels (0, 1) and (0, 2) are determined for coordinates [0, 1], and pixels (1, 1), (2, 1), (1, 2) and (2, 2) are determined for [1, 1]. The coordinates of type A are not used for an expansion, and the coordinates of type B (and types C and D) are used for a two-fold image expansion. While with the conventional replica method a value for the original image is fixedly given to the resultant image that is dominated, in this invention, the value of the original image that is to be used is determined in accordance with a rule.

In this embodiment, in order to simplify the rule, arbitrary mapping is not performed in [0, 0] to [1, 1]→(0, 0) to (2, 2), and fixed mapping is performed as much as possible. That is, fixed mapping is performed for the following three types:

Type A: v(0, 0)←V[0, 0]
Type B: v(2, 0)←V[1, 0]
Type C: v(0, 2)←V[0, 1]

While for type D, a rule that allocates v(2, 2)←V[1, 1] is employed as much as possible. For the other pixels (1, 0), (0, 1), (1, 1) (2, 1) and (1, 2), the value of a neighboring pixel that is to be used is determined in accordance with the rule that is assigned for types B to D.

The restriction imposed for semi-fixed mapping is not limited, and a new rule can be prepared. That is, once a complicated rule is prepared, arbitrary mapping can be performed, and in accordance with the complicated rule, the image quality can be improved.

An explanation will now be given for the rule for employing the connection and the positional relationship of the pixels to determine an expanded image. This rule is employed by a program, and it is difficult to write all the rules out as sentences. Thus, in this embodiment, the configuration policy for the rule will be explained.

[Rule Configuration Policy]

(1) When an image is expanded, pixels of types A, B and C of the original image should be mapped at the resultant coordinates that are indicated by positional sorting. A pixel of type D should also be mapped at the resultant coordinates unless a boundary is on the direction toward both Rgt 54 and Btm 52 (the Dbr 58 is located outside of the oblique boundary).

(2) A pixel that is connected should also be connected in an expanded image (for a pattern wherein two lines obliquely intersect, the connection of these two lines must be maintained in an expanded image. And so long as this principle is retained, the rule can be established without clearly distinguishing between the background and the foreground).

(3) When at least two pixels are connected together vertically or horizontally, and form a "boundary" (when the color of two connected pixels is not continued to neighboring pixels on the same side, the pertinent pixels are regarded as a boundary. The pixels on the other sides need not have the same color), the boundary should be also maintained in an expanded image.

(4) Vertical, horizontal and oblique "lines" may be extended along the lines so long as the "boundary" is not destroyed.

(5) If an oblique "boundary" has a length of three pixels or more, it is assumed that this boundary is the original oblique line, and this "boundary" should be formed as an oblique line in an expanded image. When the "boundary" has a length of only two pixels, however, the succeeding sorting of the connection is performed to determine whether the boundary should be expanded as an oblique line or as a stepped line. For an end point, such as a raised portion in a convex character, whether it should be extended as a "line" or should be expanded as an oblique line is determined by performing an examination to determine whether the lower portion is a single line or whether a connection succeeding the lower portion spreads downward.

(6) In a set of pixels that are connected to each other, an element that constitutes a "line" having a one-pixel width (if an element has a length of two pixels or more, it is regarded as a line), the pertinent element should have a one-pixel width in an expanded image. If the portion is expanded into a two-pixel width or greater, the pixels connected in the same direction are also expanded to the same width. This is called propagation.

(7) A "line" having a two-pixel or greater width may be expanded into a three-pixel width or more accordingly. This property is propagated to all the pixels included in the same "line." Similarly, a portion having a 2×2 pixel size or larger may be expanded vertically and horizontally.

(8) A portion having at the least a predetermined size that may be expanded vertically and horizontally is regarded as a so-called "region" for the game of "go". When, as in a stripe pattern composed of lines having a one-pixel width, a stripe that may be expanded can not be locally determined, a line that is connected to the "region" is expanded. The precision and the size of a working buffer are determined in accordance with the distance whereat propagation starts.

(9) An area having a one-pixel width that is enclosed by a line having a one-dot width may be expanded as a "skipping region" if an area outside the enclosed area is a "region," or is continuous from the "region" and represents the same color.

(10) A dot formed of only one pixel that is not connected to any neighboring pixel may be expanded so long as it is inconsistent with another condition.

(11) If, although very seldom, the value of a resultant pixel at the coordinates that must be interpolated can not be determined in accordance with any of the rules, the pertinent pixel is embedded by using the value of the original pixel of a corresponding coordinate type, or by mixing the color with the color of that adjacent original pixel.

If a rule is prepared according to the above policy, the fine structure in an image can be maintained. For example, for expansion by less than twice, the readability is deteriorated if the line having a one-pixel width is converted into a line having a one-pixel width and a two-pixel width. Therefore, the pixel having a one-pixel width remains as it is, and a line having a two-pixel width or more, which is not outstanding even when the width is changed, and a dot, which does not affect the other pixels if it is expanded, are selected and expanded. In other words, the fine structure having a one-pixel width remains as it is even when it is expanded.

According to the above policy, the local determination can be performed to ascertain whether a specific pixel is one part of a small font or a detailed figure, or is one part of a line or a photograph/picture originally having a specific width. In a general way, this determination requires an operation for extracting a text area to distinguish a font from the background; however, the present invention does not require such an operation. In this embodiment, only the indirect assumption of a "region" is performed, and basically, the foreground and the background are treated equally. Since the whole process for determining the background and the foreground is not required and the connection of neighboring pixels is employed to process each pixel, this method is appropriate for high-speed horizontal logic.

Further, the "propagation" distance is restricted in accordance with the size of the working buffer, and this restriction defines the degree of an expansion error due to the rule. Experimentally, the propagation distance is either equivalent to or slightly greater than the number of lines in an 8-bit memory in which the connection is stored.

The "arbitrary mapping" that was described for the position sorting process loosens the fixed mapping condition in (1), and an oblique line can be preferably expanded. However, in order to maintain the condition in (2) for defining the "connection" and the condition in (3) for defining the "boundary," a considerably complicated rule must be prepared.

FIGS. 9A to 9D are diagrams showing an example process for expanding an image based on the rule configuration policy. The rules (1) and (2) above are major premises, and are always employed.

Figure 9:
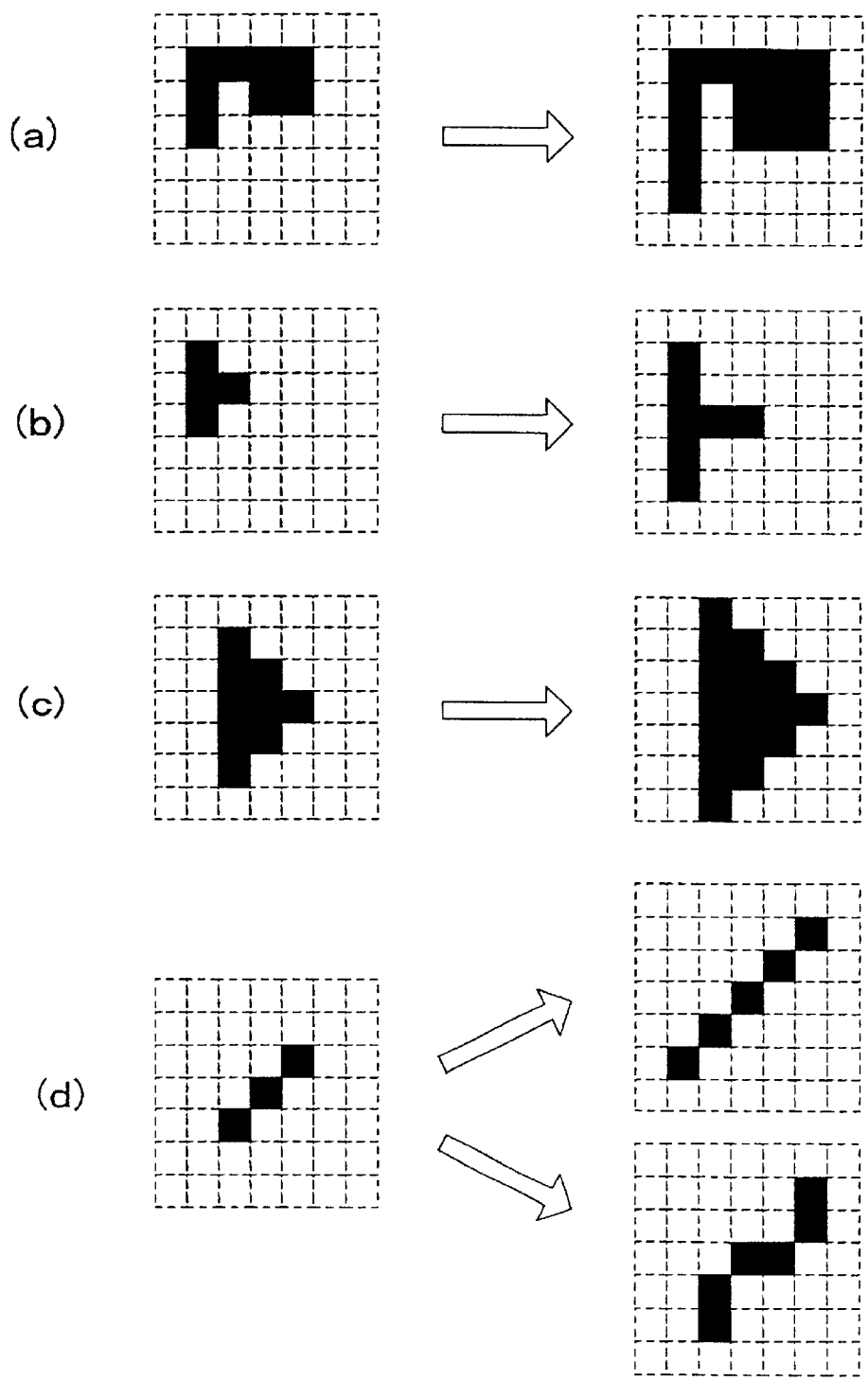
FIGS. 9A to 9D are diagrams showing an expansion example based on the rule configuration policy.

In FIG. 9A, since a left vertical line has a one-dot width, according to the rule (6) the one-dot width is maintained. At this time, according to the rule (4) the line is extended vertically, but only downward because the boundary close to the top side is retained according to the rule (3). A blank inside corresponds to a protrusion of one dot, and according to the rule (5) is extended vertically, not as an oblique boundary, but as a protrusion. Further, according to the rule (7) the solid black 2×2 portion on the right side is expanded into the 3×3 portion. In this example, the boundary is retained according to the rule (3), so that the top side matches the top side of the left vertical line. The blank area is the background in this example, and is expanded according to the rule (7) (extended to the outside of FIG. 9A).

In an example in FIG. 9B, an image is determined to be a protrusion having a convex shape according to the rule (5). In the example in FIG. 9C, an image is determined to be an oblique boundary according to the rule (5).

In FIG. 9D, an image is determined to be an oblique line according to the rule (5), the line is extended obliquely according to the rule (4), and the one-dot width is maintained according to the rule (6). When the original coordinates for the oblique line pass only type A and type D, the rule (1) is employed where the original coordinates are not mapped to the resultant coordinates of type D, and as is shown on the upper right side in FIG. 9D, the image is mapped into a satisfactory oblique line. If the original coordinates of the oblique line pass only types B and C, the rule (1), "the original coordinates should be mapped into the resultant coordinates," is employed, and in response to the request concerning the connection in the rule (2), a jig-jag oblique line is obtained, as is shown on the lower right side in FIG. 9D. In the upper right and the lower right diagrams in FIG. 9D, the rule (2) is also employed for the white area in the background, and the oblique connection is maintained while the black oblique line intersects the white area.

Figure 10:
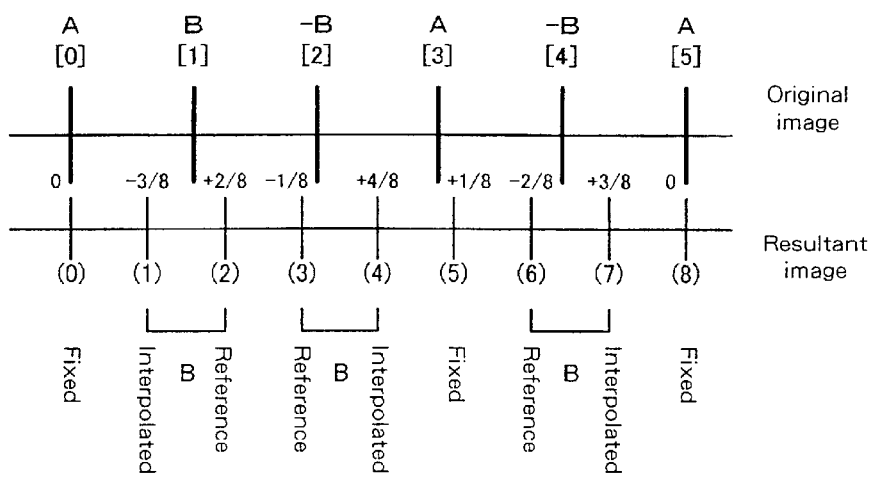
FIG. 10 is a diagram showing the positional relationships existing between original coordinates and resultant coordinates obtained by an expansion method using 8/5 as a multiplier.

FIG. 10 is a diagram showing the positional relationship existing between the original coordinates and the resultant coordinates obtained by an expansion method using an 8/5 multiplier. In the above explanation, the expansion method using a 3/2 multiplier was employed to be described that there are type A, of the coordinate point that is basically not expanded, and type B (and types C and D), of the coordinate point that is basically to be expanded, and these points are expanded in accordance with the rule. The expansion method for which a multiplier of twice or more is used, can be implemented by appropriately modifying the rule for this embodiment, with the exception that an operation for expanding each pixel n times is additionally included. For an expansion of less than twice that is equal to or greater than 3/2, type A and type B (and types C and D) are uniformly distributed, and when the resultant coordinates are inversely projected onto the original coordinates, a difference at the pixel coordinates, which are fixedly mapped, is minimized.

To simplify the presentation, an explanation will be given by using only types A and B in one dimension. In two dimensions, type C in direction Y corresponds to type B in direction X, and the coordinates whereat type B is in direction X and type C is in direction Y are defined as type D.

In FIG. 10, the center of a pixel at the original coordinate [0] of the original image is so arranged that it matches the center of a pixel at the resultant coordinate (0) of the resultant image. The fractions written between the original image and the resultant image represent distances between the resultant coordinates and the nearest original coordinates.

Since an expansion using an 8/5 multiplier is performed, three pixels of type B to be expanded twice must be included among five original pixels. In FIG. 10, these three pixels are distributed in an array {A, B, −B, A, −B}. In this case, −B is obtained by exchanging the left and right coordinates that are fixedly mapped for type B. In FIG. 10, a point "reference" corresponds to this point, and a point closer to the original coordinate is selected.

When the inverse projection, where the centers of pixels are matched, is employed, at an expansion rate of m/n times (n<m<2n), according to the algorithm for sorting the original coordinates into types A and B, a point for which the distance from the resultant coordinate and the original coordinate is inverted from "negative to positive" is defined as type B, and the other points are defined as type A. Of the two resultant coordinate points that are determined to be type B, if the point closer to the nearest original coordinate is located on the right side, the original coordinate is sorted as "B." But if the pertinent point is located on the left side, the original coordinate is sorted as "−B."

Figure 11:
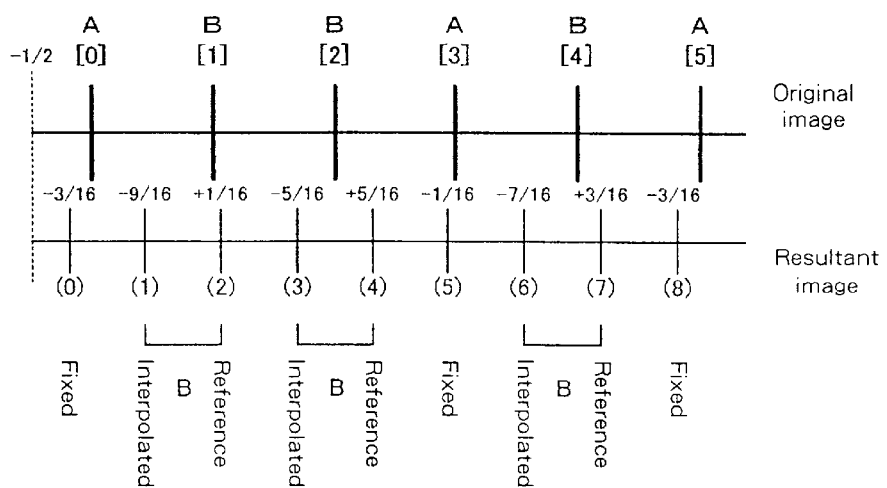
FIG. 11 is a diagram showing the positional relationship existing between original coordinates and resultant coordinates obtained by an expansion method using 8/5 as a multiplier.

FIG. 11 is a diagram showing the positional relationship existing between the original coordinates and the resultant coordinates when, as in FIG. 10, the expansion method uses an 8/5 multiplier. In FIG. 11, the positions of the original coordinates and the resultant coordinates are shown when the expansion using the 8/5 multiplier is performed for an image of an image size matching type (the left side of the rectangle of a pixel at the left end in the original image matches the left side of the rectangle of a pixel at the left end in the resultant image).

In this case, the above algorithm may also be calculated based on the coordinate inverse projection for the image size matching type. In this embodiment, all the −Bs in the example in FIG. 10 are rewritten as Bs. This is because, of the points of type B that are thus defined, the point on the right side is closer to the nearest original coordinates at the expansion ratio that is mainly used in this embodiment. If −B is not employed, accordingly, the rule configuration can be simplified even more.

When the inverse projection where the sizes of pixels are matched is employed, at the expansion rate of m/n times (n<m<2n), according to the simplified algorithm for sorting the original coordinates into types A and B, a point for which the distance from the resultant coordinates and the original coordinates is inverted from "negative to positive" is defined as type B, and the other points are defined as type A.

When the algorithm is mounted in an LCD monitor, it should be provided as a fixed function while taking the above described six types into account, and the algorithm need not be calculated each time.

The resolution conversion method used for the embodiment has been described in detail. Next, an image processing apparatus for which the embodiment is applied will be described. The image processing apparatus of this embodiment can be implemented as a liquid crystal display (LCD) monitor, which receives original image data from a host, such as a connected PC, converts the original image data into expansion image data having a higher resolution, and displays the obtained image data on a display, such as a liquid crystal display cell. The image processing apparatus can also be carried out by a notebook PC that includes the host. It should be noted that no detailed explanation will be given for a liquid crystal display cell and the X and Y drivers that feed a voltage to the display cell.

FIG. 1 is a diagram showing the image processing apparatus according to the embodiment of the present invention. This apparatus can be implemented as an LCD controller that is internally provided for an LCD monitor or a notebook PC. The image processing apparatus comprises: an original image data input unit 11, for receiving original image data during the processing for each set of coordinates; a pixel value buffer 12, for storing the values of a current target pixel and eight neighboring pixels; a connection detector 13, for sequentially processing pixels one-dimensionally; a connection buffer 14, for storing the obtained connection of pixels; an expanded width propagation detector 15, for processing pixels one-dimensionally to determine whether the width can be expanded; an expanded width propagation buffer 16, for storing the results that the width can be expanded or not; a rule application unit 17, for employing a predetermined rule to select a pixel value at coordinates that are determined by the pixel value buffer 12; a copy source index buffer 18, for storing the coordinates of the selected pixel value; and a result output unit 19, for outputting the results obtained by the rule application unit 17. The pixel value buffer 12, the connection buffer 14, the expanded width propagation buffer 16, and the copy source index buffer 18 are line buffers or frame buffers.

Assume that pixel values are received in a time series, by the original image data input unit 11, as a one-dimensional stream data that is a continuation of horizontal scan lines, as are used for the scanning of a CRT display. The pixel value buffer 12 is so designed that the values of a current target pixel and of eight neighboring pixels are given to the connection detector 13, the values of the current target pixel and pixels at a distance of at least one pixel are given to the expanded width propagation detector 15, and the values of the current target pixel and the eight neighboring pixels are given to the rule application unit 17.

The connection detector 13 sequentially processes the pixels one-dimensionally, determines whether the pixel value at the target coordinates and the values of the eight neighboring pixels represent similar colors, and writes the 8-bit connection results in the connection buffer 14. The propagation detector 15 also sequentially processes pixels one-dimensionally, refers to the connection results stored in the connection buffer 14 to determine whether the pixel at the target coordinates can be expanded, and writes the results as one-bit data in the expanded width propagation buffer 16.

The rule application unit 17 sequentially processes the pixels one-dimensionally, employs the rule for the data received from the connection buffer 14, the expanded width propagation buffer 16 and the copy source index buffer 18, and selects the pixel values at the coordinates that are determined by the pixel value buffer 12. A one-dimensional stream of data for the pixel values is output in a time series as the resolution conversion results. The coordinates of the selected pixel values are written in the copy source index buffer 18, and are used for the succeeding application of the rule to expand the width of a pixel.

Figure 2:
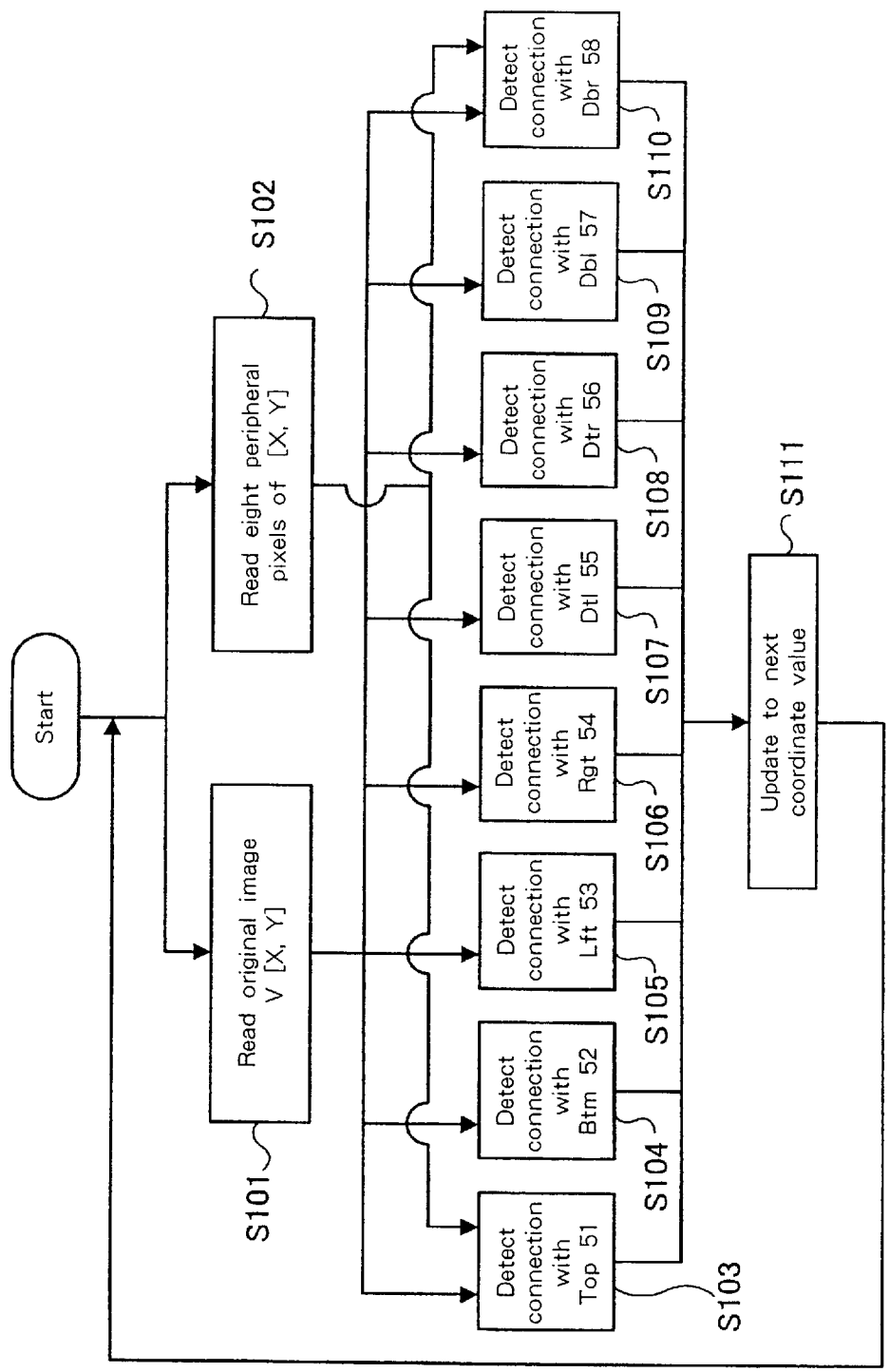
FIG. 2 is a flowchart for explaining the processing performed by a connection detector 13.
Figure 3:
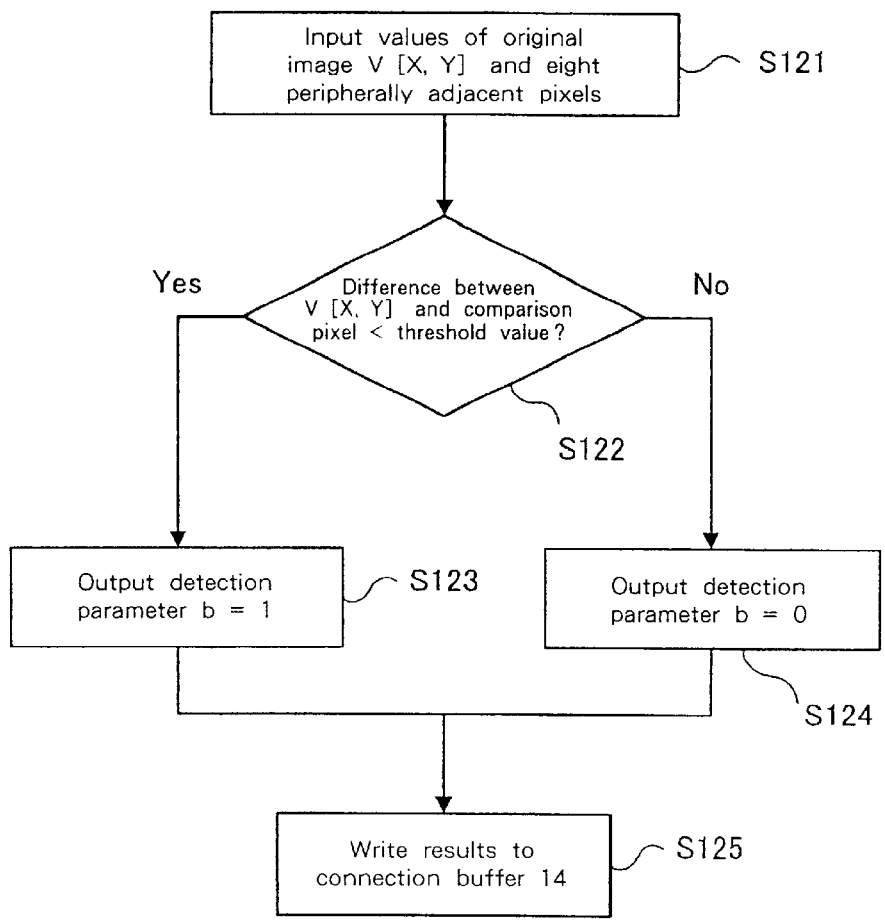
FIG. 3 is a flowchart for explaining the processing performed by the connection detector 13.

FIGS. 2 and 3 are flowcharts for explaining the processing performed by the connection detector 13. An overview of the processing is shown in FIG. 2, and the internal processing is shown in FIG. 3. As is shown in FIG. 2, as the overview of the processing, first, the target pixel 50 of the original image V [X, Y] is read (step 101), and eight peripherally adjacent pixels of the target pixel [X, Y] are read (step 102). Then, the connections of the target pixel 50 to the pixels that are adjacent in the eight directions are examined at eight places (steps 103 to 110): the detection of the connection with the Top (immediately above) 51 (step 103); the detection of the connection with the Btm (immediately below) 52 (step 104); the detection of the connection with the Lft (left) 53 (step 105); the detection of the connection with the Rgt (right) 54 (step 106); the detection of the connection with the Dtl (upper left) 55 (step 107); the detection of the connection with the Dtr (upper right) 56 (step 108); the detection of the connection with the Dbl (lower left) 57 (step 109); and the detection of the connection with the Dbr (lower right) 58 (step 110). Then, the updating to the next coordinate value is performed (step 111). Thereafter, program control returns for the next coordinate position, and the same processing is repeated.

The processing for detecting the connection in each direction is shown in FIG. 3. First, the target pixel 50 of the original image V [X, Y] and the eight neighboring pixels are input by the original image data input unit 11 and the pixel value buffer 12 (step 121). Then, the difference between the value of the target pixel 50 and the value of each peripherally adjacent pixel (comparison pixel) is obtained (step 122). If this difference is smaller than a predetermined threshold value, it is assumed that a connection is established between the two pixels, and a detection parameter "b" is set to 1 (step 123). If the difference is greater than the threshold value, it is assumed that no connection is established, and the detection parameter "b" is set to 0 (step 124). The results obtained at steps 123 and 124 are then stored in the connection buffer 14 (step 125). At this time, when the connection of pixels is detected sequentially by scanning, beginning at the upper left, the process has already been completed for the pixel immediately above (the Top 51), the left upper pixel (the Dtl 55), the right upper pixel (the Dtr 56) and the left pixel (the Lft 53) from the target coordinates [X, Y]. Therefore, these processes can be performed efficiently when the result information is stored in the buffer. In this case, the processing for detecting a connection differs from that in FIG. 3. For a R, G and B color image, at step 122 the difference between the R, G and B values can be determined, and the obtained AND (logical product) can be used as the result produced at step 122.

Figure 4:
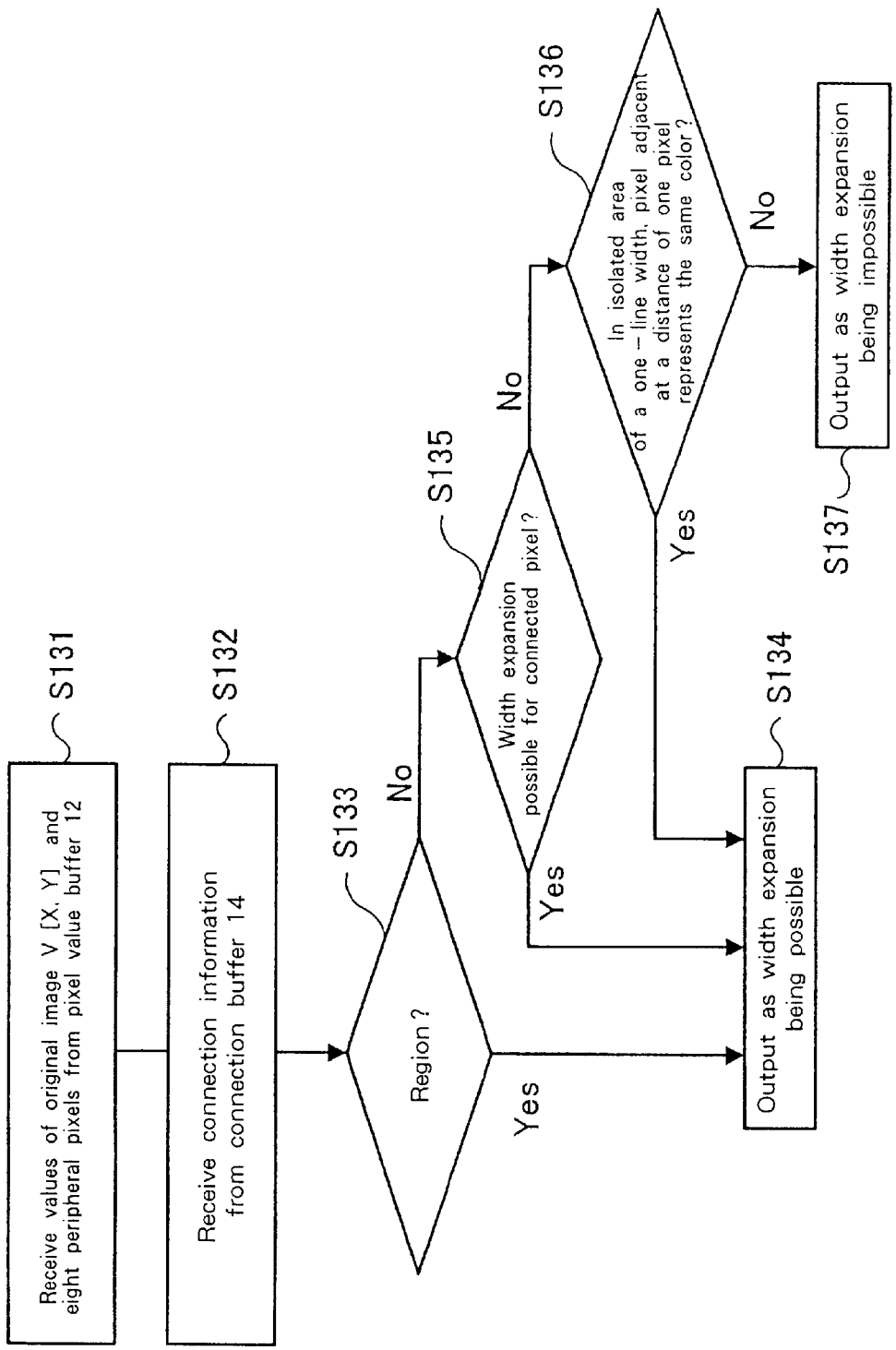
FIG. 4 is a flowchart for explaining the processing performed by an expanded width propagation detector 15.

FIG. 4 is a flowchart showing the processing performed by the expanded width propagation detector 15. First, the current target pixel (the target pixel 50) of the original image V [X, Y] and the eight peripherally adjacent pixels are input by the pixel value buffer 12 (step 131). Following this, the connection information from the connection buffer 14 is input (step 132). These data are employed to determine whether the target pixel 50 is a "region" (step 133). When the target pixel 50 is determined to be a "region," information that the width expansion is enabled is output (step 134), and is written in the expanded width propagation buffer 16. When at step 133 it is determined that the target pixel 50 is not a "region," a check is performed to determine whether the width of the connected pixel can be expanded (step 135). If the width can be expanded, the information that width expansion is possible is output (step 134). If the width can not be expanded, however, a check is performed to determine whether the target pixel 50 is an isolated area having a one-line width, and whether an adjacent pixel separated by a distance of one pixel represents the same color (step 136). If the colors match, information that width expansion is possible is output (step 134). If the colors do not match, information that width expansion is impossible is output (step 137), and is written in the expanded width propagation buffer 16. In other words, if one of the above conditions is true for the connection of pixels, the expanded width propagation detector 15 determines that width expansion is possible and writes this information in the expanded width propagation buffer 16.

Figure 5:
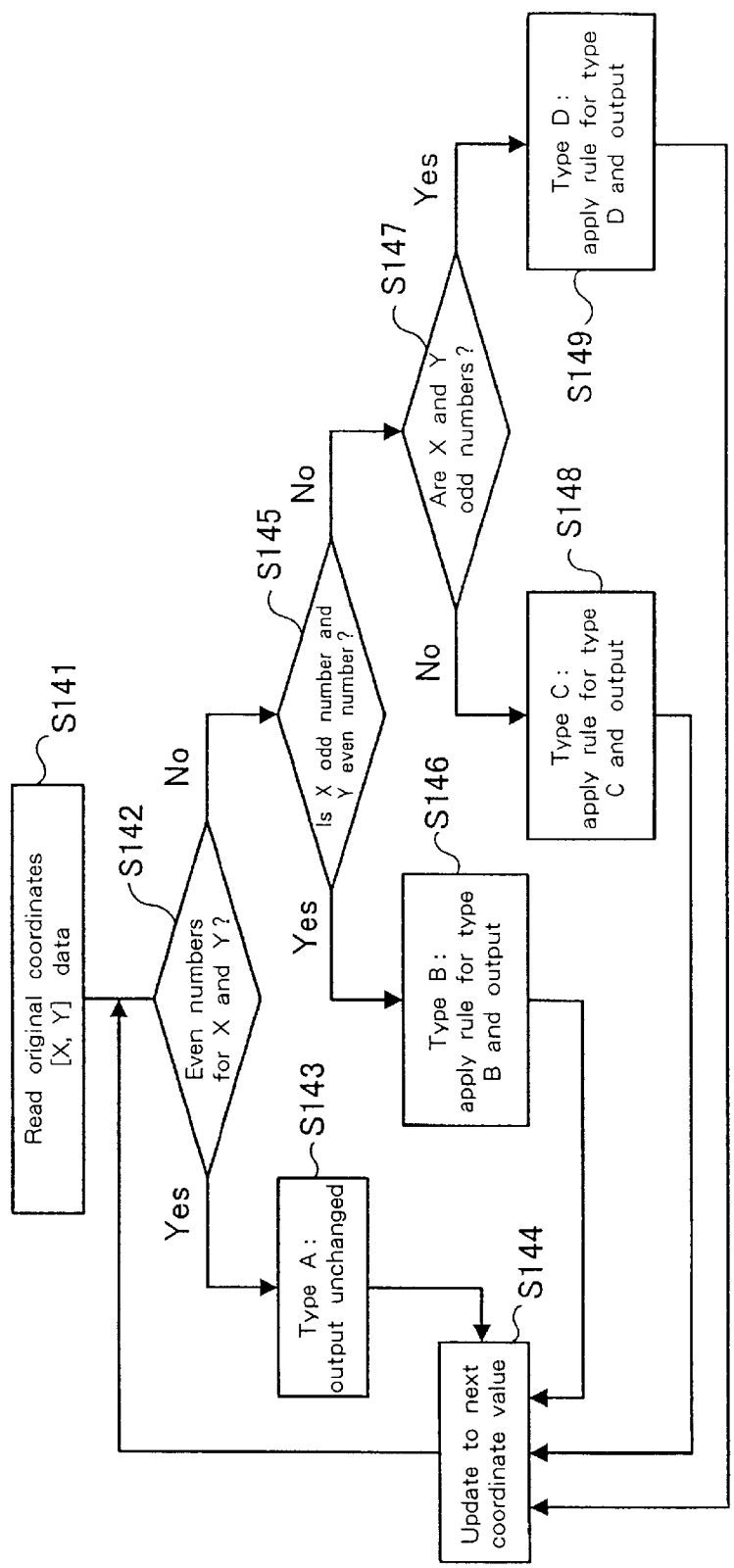
FIG. 5 is a flowchart for explaining the processing performed by a rule application unit 17.

FIG. 5 is a flowchart showing the processing performed by the rule application unit 17. For this processing, an expansion rate of 3/2 is employed. First, the original coordinate [X, Y] data are read (step 141). A check is then performed to determine whether X and Y of the coordinates are even numbers (step 142). If the two values are even numbers, the coordinates are classified type A, and as a result, the value of the original image is output unchanged (step 143). Then, the updating to the next coordinate values is performed (step 144). If the X and Y values are not even numbers, however, a check is performed to determine whether X is an odd number and Y is an even number (step 145). If so, the coordinates are classified type B and are output by employing the above described rule for type B (step 146), and the updating to the next coordinate values is performed (step 144). But if X is not an odd number and Y is not an even number, i.e., if X is an even number and Y is an odd number, the coordinates are classified type C and are output by using the rule for type C (step 148), and the updating to the next coordinate values is performed (step 144). When finally, at step 147, X and Y are determined to be odd numbers, the coordinates are classified type D and the rule for type D is employed (step 149), and the updating to the next coordinate values is performed (step 144). Program control thereafter advances to the next coordinate position, and the above processing is repeated for each coordinate position. When an expansion rate other than 3/2 is employed, the sorting of the coordinates is also performed by referring to the coordinate values X and Y, but in this case, instead of using determination that is based on even and odd numbers, the above rules are employed to determine types A, B, C and D.

An explanation has been given for the algorithm used for the image conversion method of this embodiment, and the image processing apparatus (image display apparatus) that employs the algorithm.

As is described above, in this embodiment, a thin, one-dot width line can be maintained unchanged in an expanded image. When a thin line for a font is expanded, and when the obtained line is thin at one portion and thick at another, so that the line is not even, it is very difficult to read the font. Further, when a one-dot width line is expanded less than twice, the resultant line looks bad, because the line has both a one-dot width and a two-dot width. On the other hand, even if the line of the two-dot width is changed into a two-dot width and a three-dot width, the resultant line does not look so bad. According to this embodiment, the characteristic of these lines can be precisely understood and be coped with, so that a sharp, expanded image that is easily seen can be provided for a user.

In addition, for a font composed of thin lines, the shape of a character can not easily be identified unless the pixels to be coupled together represent the same tone and the same hue. In this embodiment, a continuous frame line can be obtained that has the same color throughout, and the readability can be improved.

When a long line drawn by line graphics is expanded, it is preferable that the hue and tone of the line not vary along its length. Especially if, depending on the location, the color of a line in an expanded image varies, the resultant drawing will differ from the original drawing. According to this embodiment, the skeleton of the same color line can all be connected and displayed, so that the appearance of an expanded image can be improved dramatically.

As is described above, according to the present invention, a font or a thin line that has many stepped edges can be displayed in sharp, bright colors that stand out on a graphics screen on an information display device such as an LCD (Liquid Crystal Display) panel or a projector.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. An image conversion method for converting original input image data into image data that is expanded less than twice, comprising:

examining a connection between a target pixel in said original input image data and pixels neighboring said target pixel;

employing said connection to determine whether said target pixel constitutes a one-pixel width line; and determining, when said target pixel constitutes a one-pixel width line, the value of a resultant pixel in said expansion image data in order to retain said one-pixel width even in said expansion image data.

2. The image conversion method according to claim 1, wherein the value of a pixel is determined, so that said connection with said neighboring pixels is retained when said value of said resultant pixel in said expansion image data is determined.

3. The image conversion method according to claim 1, wherein said original image data are color image data; wherein, when between said target pixel and said neighboring pixels colors match or are similar, it is ascertained that said connection with said neighboring pixels is established; and wherein said value of said resultant pixel in said expansion image data is determined so that the color of said resultant pixel matches said color of said target pixel.

4. An image conversion method for converting original input image data into expansion image data that is expanded a rational number, which is not an integer, of times, comprising:

detecting a connection between a target pixel in said original input image data and pixels neighboring said target pixel;

employing a relationship between a coordinate position for a pixel in said original image data and a coordinate position for a resultant pixel in said expansion image data to define fixed mapping that is prepared for a plurality of types into which said relationship is sorted; and determining a value for said resultant pixel based on said mapping, while said connection with said neighboring pixels is also maintained for said expansion image data.

5. The image conversion method according to claim 4, wherein the increase in the size of said expansion image data provided by conversion is less than twice, and said mapping is defined by a combination of a coordinate point type that does not perform expansion and a coordinate point type that basically performs expansion.

6. The image conversion method according to claim 5, wherein, when said connection with said neighboring pixels is employed to determine that said target pixel constitutes a one-pixel width line, a one-pixel width is maintained for said coordinate point type that basically performs expansion, and the value of said target pixel is allocated for a specific resultant pixel, while the value of a peripheral pixel of said target pixel is allocated for a resultant pixel other than said specific resultant pixel.

7. An image processing apparatus for producing, by conversion, expansion image data that is less than twice the size of the original input image data that is converted, comprising:

determination means, for employing a connection of a target pixel in said original image data with peripheral pixels of said target pixel to determine whether said target pixel constitutes a one-pixel width line;

rule application means, for employing a relationship between a coordinate position of a pixel in said original image data and a coordinate position of a resultant pixel in said expansion image data to define a plurality of types into which said relationship is sorted, and for applying a rule to said plurality of types that are defined; and output means, for, when said determination means determines that said target pixel constitutes a one-pixel width line, outputting a value for a resultant pixel that in accordance with a specific rule for maintaining a one-pixel width line applied by said rule application means constitutes said expansion image data.

8. The image processing apparatus according to claim 7, wherein said determination means employs said connection with said peripheral pixel to determine whether said target area at the least forms a two-pixel width area; and wherein, when it is ascertained by said determination means that said target area at the least forms a two-pixel width area, said output means outputs said value of said resultant pixel to increase the width of said area.

9. An image processing apparatus for converting original input color image data having a low resolution into expansion color image data having a high resolution, comprising:

width examination means, for comparing a target pixel in said original color image data with image data that are produced by peripheral pixels to determine whether said target pixel is a pixel having a small width or a large width; and determination means, for determining a value for a resultant pixel that constitutes said expansion color image data, so that a small width is maintained when said width examination means ascertains that said target pixel has said small width, or so that a large width is further expanded when said width examination means ascertains that said target pixel has said large width.

10. The image processing apparatus according to claim 9, wherein said expansion color image data is obtained by increasing less than twice the resolution of the original color image data; and wherein said width examination means then determines whether a pixel having a small width is a pixel that constitutes a one-pixel width line, and said determination means determines said value of said resultant pixel, so that said one-pixel width is maintained for a corresponding line of said expansion color image data.

11. The image processing apparatus according to claim 9, further comprising color examination means, for examining the color of said target pixel in said original color image data, and said determination means, for determining said value of said resultant pixel by using unchanged, without mixing with said color that is identified by said color examination means, said color of said target pixel.

12. An image processing apparatus, which produces, by conversion, high resolution expansion image data that is less than twice the size of said original input image data that is converted, and which outputs said expansion image data, comprising:

a detector for detecting a connection of a target pixel in said original image data in accordance with a value of said target pixel and a value of neighboring pixels;

a width expansion determiner for employing said connection that is detected by said detector to determine whether the width of said target pixel can be expanded; and a rule application unit for employing a relationship between a coordinate position of a pixel in said original image data and a coordinate position of a resultant pixel in said expansion image data to define a plurality of types into which said relationship is sorted, and for employing the output from said width expansion determiner to apply a specific rule for said plurality of types that are defined.

13. The image processing apparatus according to claim 12, wherein said width expansion determiner employs said connection obtained by said detector to determine whether said target pixel is a portion, having at the least a specific size, in an area that can be expanded vertically and horizontally; and wherein, when said target area is said portion, it is ascertained that the width of said target pixel can of expanded.

14. An image processing apparatus, which produces, by conversion, expansion image data that is less than twice the size of the original image data that is converted, comprising:

input means, for receiving said original image data;

connection examination means, for examining the connection of a target pixel in said original image data input by said input means and neighboring pixels;

judging means, for employing said connection obtained by said connection examination means to determine whether said target pixel constitutes a one-pixel width line; and determination means, for, when said judging means determines that said target pixel constitutes a one-pixel width line, determining a value for a resultant pixel in said expansion image data, so that said one-pixel width in said expansion image data is maintained.

15. The image processing apparatus according to claim 14, wherein the value of a pixel is determined, so that said connection with said neighboring pixels is retained when said value of said resultant pixel in said expansion image data is determined.

16. The image processing apparatus according to claim 14, wherein said original image data input by said input means are color image data; wherein, when between said target pixel and said neighboring pixels colors match or are similar, said connection examination means ascertains that said connection with said neighboring pixels is established; and wherein said determination means determines said value of said resultant pixel in said expansion image data so that the color of said resultant pixel matches said color of said target pixel.

17. An image display apparatus, which produces, by conversion, high resolution expansion image data that is less than twice the size of the original low resolution image data that is converted, comprising:

an original image data input unit for receiving said original low resolution image data;

a connection detector for detecting a connection of a target pixel in said original image data input by said original image data input unit and neighboring pixels;

a rule application unit for employing a relationship between a coordinate position of a pixel in said original image data and a coordinate position of a resultant pixel in said expansion image data to define a plurality of types into which said relationship can be sorted, and for applying a specific rule for said plurality of types that are defined;

a results output unit for determining said value of said resultant pixel in accordance with said rule applied by said rule application unit, and for outputting said expansion image data; and an image display unit for displaying an expanded high resolution image based on the output of said results output unit, wherein, when said connection detector ascertains that said target pixel constitutes a one-pixel width line, said rule application unit applies a rule that will maintain said one-pixel width even in said expansion image data.

18. The image display apparatus according to claim 17, wherein, when said connection detector ascertains that said target pixel is connected to said neighboring pixels, said rule application unit applies said rule to maintain the connection with said expansion image data.

* * * * *

UNITED STATES PATENT AND TRADEMARK OFFICE
CERTIFICATE OF CORRECTION

PATENT NO. : 6,718,072 B1
DATED : April 6, 2004
INVENTOR(S) : Sekiya et al.

It is certified that error appears in the above-identified patent and that said Letters Patent is hereby corrected as shown below:

Title page,
Item [75], Inventors: delete "Kawasaki (JP)" and insert -- Kanagawa-ken, (JP) --

Signed and Sealed this

Seventh Day of September, 2004

JON W. DUDAS
*Director of the United States Patent and Trademark Office*